(12) United States Patent
Beneker et al.

(10) Patent No.: US 9,676,298 B2
(45) Date of Patent: Jun. 13, 2017

(54) LONGITUDINAL ADJUSTMENT DEVICE FOR A MOTOR VEHICLE SEAT, COMPRISING TWO PAIRS OF RAILS

(75) Inventors: Wilfried Beneker, Leichlingen (DE); Antal Teer, Millbrook, AL (US); Burckhard Becker, Solingen (DE)

(73) Assignee: C. ROB. HAMMERSTEIN GMBH & CO. KG, Solingen (DE)

( * ) Notice: Subject to any disclaimer, the term of this patent is extended or adjusted under 35 U.S.C. 154(b) by 123 days.

(21) Appl. No.: 13/994,559

(22) PCT Filed: Nov. 3, 2011

(86) PCT No.: PCT/EP2011/069361
§ 371 (c)(1),
(2), (4) Date: Aug. 5, 2013

(87) PCT Pub. No.: WO2012/089373
PCT Pub. Date: Jul. 5, 2012

(65) Prior Publication Data
US 2013/0320179 A1   Dec. 5, 2013

(30) Foreign Application Priority Data
Dec. 30, 2010   (DE) .......................... 10 2010 064 401

(51) Int. Cl.
*B60N 2/08*   (2006.01)
*B60N 2/02*   (2006.01)
*B60N 2/07*   (2006.01)

(52) U.S. Cl.
CPC ......... *B60N 2/0881* (2013.01); *B60N 2/0232* (2013.01); *B60N 2/074* (2013.01); *B60N 2/0843* (2013.01); *B60N 2/0887* (2013.01); *B60N 2002/024* (2013.01)

(58) Field of Classification Search
CPC .......................... B60N 2/0887; B60N 2/0881
USPC ........... 248/503.1, 429, 430, 503; 296/65.13, 296/65.15
See application file for complete search history.

(56) References Cited

U.S. PATENT DOCUMENTS

| | | | | |
|---|---|---|---|---|
| 2,261,728 A | * | 11/1941 | Lawler ................... | B60N 2/045 248/395 |
| 2,307,305 A | * | 1/1943 | Saunders ............. | B60N 2/0705 297/344.1 |
| 2,723,711 A | * | 11/1955 | Duncan ......................... | 248/394 |

(Continued)

FOREIGN PATENT DOCUMENTS

| | | |
|---|---|---|
| DE | 10 68 129 | 10/1959 |
| DE | 26 08 827 | 9/1976 |

(Continued)

OTHER PUBLICATIONS

International Search Report in PCT/EP2011/069361 dated Dec. 30, 2011.

*Primary Examiner* — Jonathan Liu
*Assistant Examiner* — Chiedu Chibogu
(74) *Attorney, Agent, or Firm* — Foley & Lardner LLP (57) ABSTRACT

A longitudinal adjustment device for a motor vehicle seat has two pairs of rails. It includes a locking device for each pair of rails. It has a common actuating unit for the two locking devices, the unit interacting with both locking devices and includes a handle. The actuating unit has an electric drive motor, a gearbox which is connected to the electric drive motor, an actuator and preferably a setting unit.

19 Claims, 4 Drawing Sheets

(56) References Cited

U.S. PATENT DOCUMENTS

| | | | |
|---|---|---|---|
| 2,839,124 A * | 6/1958 | Desmond et al. | 248/393 |
| 3,220,690 A * | 11/1965 | Caughey | B60N 2/0715 248/430 |
| 3,559,499 A * | 2/1971 | Profet | F16H 25/20 74/411.5 |
| 3,582,033 A * | 6/1971 | LaFleche et al. | 248/430 |
| 3,617,021 A | 11/1971 | Littmann | |
| 3,841,696 A | 10/1974 | Wagner | |
| 4,051,302 A | 9/1977 | Mayama et al. | |
| 4,101,169 A * | 7/1978 | Muraishi | B60N 2/123 297/341 |
| 4,286,386 A * | 9/1981 | Long | G01D 5/165 172/430 |
| 4,307,799 A * | 12/1981 | Zouzoulas | B66F 3/08 192/141 |
| 4,565,344 A * | 1/1986 | Iwami | 248/429 |
| 4,629,254 A * | 12/1986 | Stolper et al. | 297/473 |
| 4,635,491 A * | 1/1987 | Yamano | B66B 9/025 187/209 |
| 4,652,052 A * | 3/1987 | Hessler et al. | 297/341 |
| 4,802,374 A | 2/1989 | Hamelin et al. | |
| 4,804,221 A * | 2/1989 | Saiki | B62J 1/12 297/243 |
| 4,927,110 A * | 5/1990 | Tsumura et al. | 248/430 |
| 4,958,799 A * | 9/1990 | Clauw et al. | 248/430 |
| 5,082,228 A * | 1/1992 | Shimazaki | B60N 2/0715 248/430 |
| 5,348,373 A | 9/1994 | Stiennon | |
| 5,350,148 A * | 9/1994 | Yamamura | 248/430 |
| 5,425,522 A * | 6/1995 | Retzlaff | 248/429 |
| 5,483,853 A * | 1/1996 | Moradell et al. | 74/665 GD |
| 5,516,071 A * | 5/1996 | Miyauchi | 248/429 |
| 5,573,219 A * | 11/1996 | Chinomi | 248/421 |
| 5,683,140 A * | 11/1997 | Roth | B60N 2/12 248/394 |
| 5,813,726 A * | 9/1998 | Husted | 297/378.11 |
| 5,918,846 A * | 7/1999 | Garrido | 248/429 |
| 5,964,442 A * | 10/1999 | Wingblad et al. | 248/429 |
| 6,126,133 A * | 10/2000 | Timon et al. | 248/429 |
| 6,152,533 A * | 11/2000 | Smuk | 297/341 |
| 6,357,814 B1 * | 3/2002 | Boisset et al. | 296/65.03 |
| 6,572,065 B2 * | 6/2003 | Koga et al. | 248/421 |
| 6,869,057 B2 * | 3/2005 | Matsumoto et al. | 248/430 |
| 6,986,493 B2 * | 1/2006 | Yokota | B60N 2/0232 248/424 |
| 7,482,544 B2 * | 1/2009 | Gong | A61G 5/14 200/1 V |
| 7,722,068 B2 * | 5/2010 | Michelau | 280/220 |
| 8,141,952 B2 * | 3/2012 | Poniatowski | B60N 2/0232 297/284.9 |
| 2001/0029796 A1 * | 10/2001 | Magaribuchi | 74/89.17 |
| 2007/0236039 A1 | 10/2007 | McMillen et al. | |
| 2008/0023613 A1 * | 1/2008 | Brewer et al. | 248/429 |
| 2008/0179932 A1 * | 7/2008 | Becker | B60N 2/0232 297/367 R |
| 2011/0163585 A1 * | 7/2011 | Beneker | B60N 2/0232 297/344.15 |
| 2012/0146379 A1 * | 6/2012 | Teer | 297/337 |

FOREIGN PATENT DOCUMENTS

| | | |
|---|---|---|
| DE | 100 57 724 A1 | 5/2002 |
| EP | 1 291 234 A1 | 3/2003 |
| FR | 2530557 | 1/1984 |
| WO | WO-2009/132944 A1 | 11/2009 |

* cited by examiner

LONGITUDINAL ADJUSTMENT DEVICE FOR A MOTOR VEHICLE SEAT, COMPRISING TWO PAIRS OF RAILS

CROSS REFERENCE TO RELATED APPLICATIONS

The present application is a National Stage of International Application No. PCT/EP2011/069361 filed on Nov. 3, 2011, which claims the benefit of German Patent Application No. 10 2010 064 401.3 filed on Dec. 30, 2010, the entire disclosures of which are incorporated herein by reference.

The invention relates to a longitudinal adjustment device for a motor vehicle seat, which comprises two pairs of rails, one locking device for each pair of rails and a common actuating unit for the two locking devices that cooperates with the two locking devices and has a handling means.

Longitudinal adjustment device of motor vehicle seats are usually either driven by an electric motor, examples for which are apparent from the US patent specifications U.S. Pat. Nos. 4,802,374 A and 3,617,021 A, or they have no drive of their own but are being adjusted by a user pulling the seat forward or pushing it back. The following invention particularly relates to the latter case; in principle, however, it can also be used in longitudinal adjustment devices driven by an electric motor.

According to the prior art the non-driven longitudinal adjustment devices comprise a separate locking device for each pair of rails. Normally, this is in a locked state. In this state, it blocks a longitudinal displacement of the rails of the respective pair of rails relative to one another. The locking device can be brought into a release position via the actuating device; in this position, a longitudinal adjustment of the rails relative to one another is not possible. Examples for longitudinal adjustment devices that can be longitudinally adjusted by means of a force introduced by the user can be found in DE 2 608 827 A1, DE 100 57 724 B4, there FIGS. 1a and 2, and WO 2009/132944.

In the case of motor vehicle seats, more and more efforts are being made to economize on space. This particularly applies to the space underneath a seat area. There is a desire to be able to install the seat as low as possible; and for space being available underneath the seat area for different units and also for extras. An actuating unit generally requires a lot of space that is no longer available for other components and units.

In particular in the case of motor vehicle seats that are longitudinally displaceable in the longitudinal adjustment device by tilting their backrest, there is the additional problem that this longitudinal adjustment is not triggered by the handling means but by actuating, e.g. folding forward, the backrest. Mechanical transmission means that constitute a certain expenditure are provided for this release of the locking devices. In particular in seats such as are used in passenger vehicles that have only one door for each side of the vehicle, there is a demand for a simplification of the actuating unit.

In the known manner, each pair of rails comprises a floor rail and a seat rail. The floor rail is designed for attachment to a floor assembly of a motor vehicle. The seat rail serves for the connection to components of the seat. The floor rail and the seat rail are displaceable relative to each other in a longitudinal direction of the rails. They rest against each other via sliding or rolling elements. The floor rail usually comprises a latching strip with latching windows and latching webs; it further comprises at least one latching tooth that can engage into a latching window and comes to rest against at least one latch, whereby the locked state is achieved.

Nowadays, locking devices are most frequently equipped with two and several latching pins. Not all of those are in engagement in the locked state. Operating errors can occur in the case of manual actuation of the actuating unit. Operating errors can also occur if the actuating levers of the actuating unit are exposed to too much stress, for example if too large a force is introduced into them; this can also occur due to vandalism. Finally, it may happen that the handling means of an actuating unit is mechanically blocked by a foreign body, whereby the function is affected and the locking devices are either constantly released or cannot be released without the foreign body having been removed before.

It is the object of the invention to further develop the longitudinal adjustment device of the kind mentioned in the introduction in such a way that the required space is reduced, that it is suitable particularly for motor vehicle seats with a variety of properties, for example also for motor vehicle seats that can be displaced in a forward direction by tilting the backrest, and that enables a reliable actuation.

The object is accomplished by a longitudinal adjustment device for a motor vehicle seat, which comprises two pairs of rails, one locking device for each pair of rails and a common actuating unit for the two locking devices that cooperates with the two locking devices and has a handling means, characterized in that the actuating unit comprises an electric drive motor, a gear unit connected to this electric drive motor, an actuator and preferably a setting unit.

In this longitudinal adjustment device, the actuating unit is no longer designed for a manually actuated release of the locking devices, but is motor-operated. A handling means, which is usually configured to be large and into which a sufficiently large actuating force can be introduced, and which is most frequently located underneath the front edge of the vehicle seat, is omitted. It is replaced with a button or corresponding electric component that can be placed anywhere because it is connected only electrically, and not mechanically. An operating error with too much or too little actuating force is now virtually excluded because the correct actuating force is in each case provided by the electric drive motor. The button can easily be protected against too high an actuating force. Construction space is saved because the actuating unit can now be configured to be smaller. The drive motor can be configured to be small; a drive motor suffices that has less than 20% of the power of an actuating motor of the longitudinal adjustment mechanism and/or that has less than ⅓ of the volume of such an actuating motor. The drive motor drives an actuator via the gear unit. The actuator preferably carries out a linear movement. It acts upon the two locking devices, more specifically on the disengagement levers.

The setting unit is provided for being able to adapt the actuating unit to an individual actuating unit in such a way that the two locking devices are safely and more reliably actuated. In particular, imprecisions in the assembly of the individual components, for example of the two pairs of rails, are compensated by the setting unit.

In a preferred embodiment, the actuating unit comprises at least one rotation-preventing means. This rotation-preventing means ensures that the actuator cannot pivot about its longitudinal axis relative to the locking devices. Usually, the electric drive motor is driven only in one direction of rotation; it merely has to be able to pull the two locking devices free. Fastening the locking devices is possible in principle by means of the actuating unit, but is usually caused by springs. The release is effected against the force of these springs. The springs secure a lock once the actuator is no longer actively actuated, i.e. the handling means is released. The handling means is usually configured as an actuating lever or arm.

Preferably, the actuating unit is mechanically connected only to the two locking devices, particularly their disengagement levers. Other means for attachment or support are not necessary for the actuating unit.

The force required for releasing the locking device varies from case to case. If the motor vehicle is in a tilted position, if, for example, the front of the vehicle points obliquely upwards on a rising road, the seat is exposed due to a user to a load towards the rear and therefore, higher frictional forces have to be overcome than in the case of a vehicle standing on a plane surface. Frequently, the pairs of rails are not horizontally installed in motor vehicles, but with a slight inclination towards the rear. This leads to a force component that wants to move the seat towards the rear. This can be compensated in the known manner by means of a spring, which is, in particular, configured as a tension spring and disposed between the rails of the pair of rails.

A locking device usually comprises a disengagement lever. It is also referred to as an unlocking lid. It is pivotable about a disengagement lever axis. If possible, the latter should extend perpendicularly, in any case transversely to the longitudinal direction of the actuator. Furthermore, the disengagement lever should, if possible, be at right angles to the longitudinal direction of the actuator in the locked state so that the full force component of the electric drive motor can be introduced into the disengagement lever.

Preferably, the two locking devices are configured as mirror images of each other; they are mirror-symmetrical to a parallel to the y-z plane. Preferably, the direction of the force that acts on the disengagement lever of a seat side in order to pull the locking device there into the release position is substantially directed 180 degrees opposite to the direction of the corresponding force for the other seat side. Preferably, the direction of the force that acts on the disengagement lever of a seat side in order to pull the locking device there into the release position is directed towards the other pair of rails.

The applicant reserves the right to combine any features and sub-features from parts of sentences and/or claims, in the latter case also partial features, with one another in any form, even if this is not expressly stated in the description.

Other advantages and features of the invention become apparent from the other claims as well as from the following description of exemplary embodiments of the invention, which are to be understood not to be limiting and which will be explained below with reference to the drawing. In the drawing:

As is customary in automotive engineering, an x-y-z right-handed orthogonal coordinate system is used for the following description. The longitudinal adjustment device comprises two pairs of rails 20, each of which comprises a floor rail and a seat rail. Guiding means, such as balls, for example, are not shown. A locking device 22, 24 is allocated to each pair of rails 20, with 22 being the locking device of the right-hand seat side and 24 the locking device of the left-hand seat side. The two seat rails support a vehicle seat represented in dash-dotted lines. It has a seat area 26 and a backrest 28.

A common actuating unit 30 is allocated to the two locking devices 22, 24. It is located between the two locking devices 22, 24. It comprises a handling means 32 in the form of an electric button that can be actuated, i.e. pushed, in accordance with the arrow 34. It further comprises an electric drive motor 36 which is electrically connected via lines 38 with, on the one hand, the handling means 32 and, on the other hand, with connecting terminals 40. A battery 41, for example, is connected to the terminals; a control unit can also be connected and the like.

In an alternative, a release lever 42 is provided on the backrest 28 for triggering the folding forward of the backrest. It need not be provided; it is provided especially for motor vehicles with only one side door per vehicle side. The release lever 42 has an electrical function; it acts as a button. It is connected in parallel to the handling means 32 via a supply line 44 shown in dashed lines. It can additionally have a mechanical function, such as, for example, the unlocking of a backrest fitting. By showing the supply line 44 in dashed lines, it is made clear that, just like the release lever 42, is does not necessarily have to be provided.

The drive motor 36 is configured as a miniature motor. It has a power that is considerably lower than the electric motors customarily used for driving longitudinal adjustment devices, for example only ⅓ of this power and less, preferably less than 15% of this power. It is also considerably smaller with regard to its volume than such a motor as it is used for longitudinal adjustment; it has a volume that is less than 50% of such an electric motor, preferably less than 25%. Preferably, high-rev miniature motors are used as the drive motor 36. The speed can be above 5,000 r.p.m., preferably above 8,000 r.p.m.

A gear unit 46 is next in line from the driving motor 36. It comprises at least one reduction stage. On the output side, it is connected to an actuator 48, which in this case is configured as a rack-and-pinion drive. Specifically, it comprises a pinion that is in engagement with a toothed rack 50 and moves the latter parallel to the y-direction. The adjustment force is in excess of 100 N, preferably, it is about 150 N. The gear unit 46 and the actuator 48 are accommodated in a common housing 47; preferably, the drive motor 36 is also accommodated in this housing 47. Preferably, at least the components of the actuator 48 are made from plastic. The housing 47 can also be made from plastic. It is possible to manufacture also the gear unit 46 from plastic.

In its extension, the toothed rack 50 is connected to a connecting piece 52 carrying an internal thread. A rod 54 having an external thread adapted thereto is in engagement with it. At its other end region, it is hinged to a disengagement lever 56 of the left-hand locking device 24. The rod 54 substantially extends parallel to the y-axis. As can be seen from FIG. 2, the disengagement lever 56 is virtually vertical in the locked state shown, it thus extends parallel to the z-axis. The drive motor 36 is located in a region between the two pairs of rails 20. This also applies to the greatest part of the rod 54. At its left-hand end region, the rod 54 has a short bent portion obliquely upwards, which in turn transitions into an end piece 58 extending parallel to the x-axis. This end piece is mounted in two places in the disengagement lever 56, as is apparent, for example, from FIG. 1. The mounting points 57 (shown, for example, in FIGS. 1-3) are spaced from each other by more than 10 mm, as shown, for example with distance 59 in FIG. 1. This provides protection against torques; the rod 54 cannot be pivoted about an axis that is defined by the connecting piece 52 and parallel to the y-direction. Thus, an anti-rotation protection of the engagement of the threads of the connecting piece 52 and the rod 54 is achieved.

On the right-hand seat side, the housing 47 is directly connected to the disengagement lever 56. To this end, the housing, just like the above-described bent portion of the rod 54, has two parallel oblique arms 60, each of which has at its free end a bore hole. A bearing pin, which is fixed at two mounting points 57 of the disengagement lever 56, is plugged through it. The mounting points 57 are spaced from each other by more than 10 mm, as shown, for example with distance 59 in FIG. 1. This provides protection against torques. Thus, a rotation-preventing means is obtained. Again, the disengagement lever 56 extends vertically, i.e. parallel to the z-axis.

Figure 3:
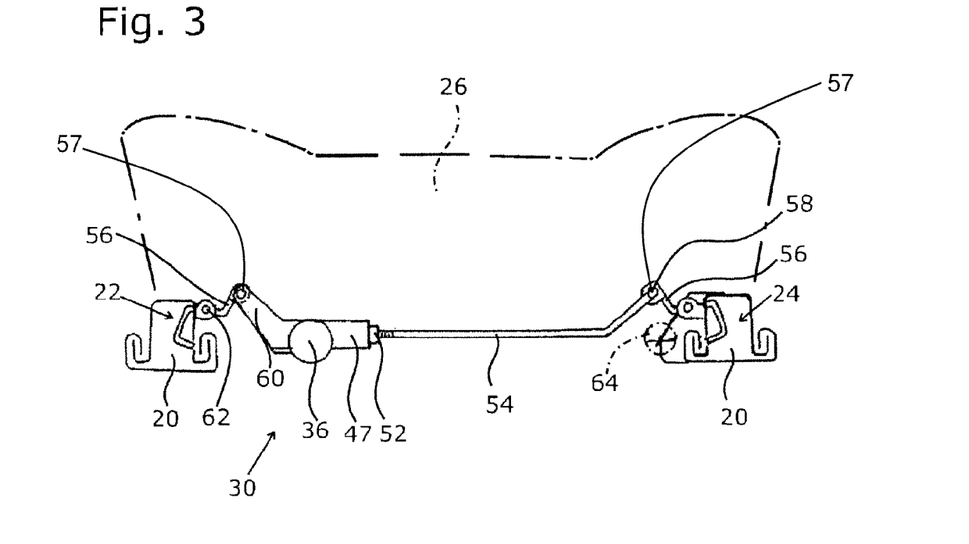
FIG. 3: shows the view of FIG. 2, but with the release position now being shown.
Figure 4:
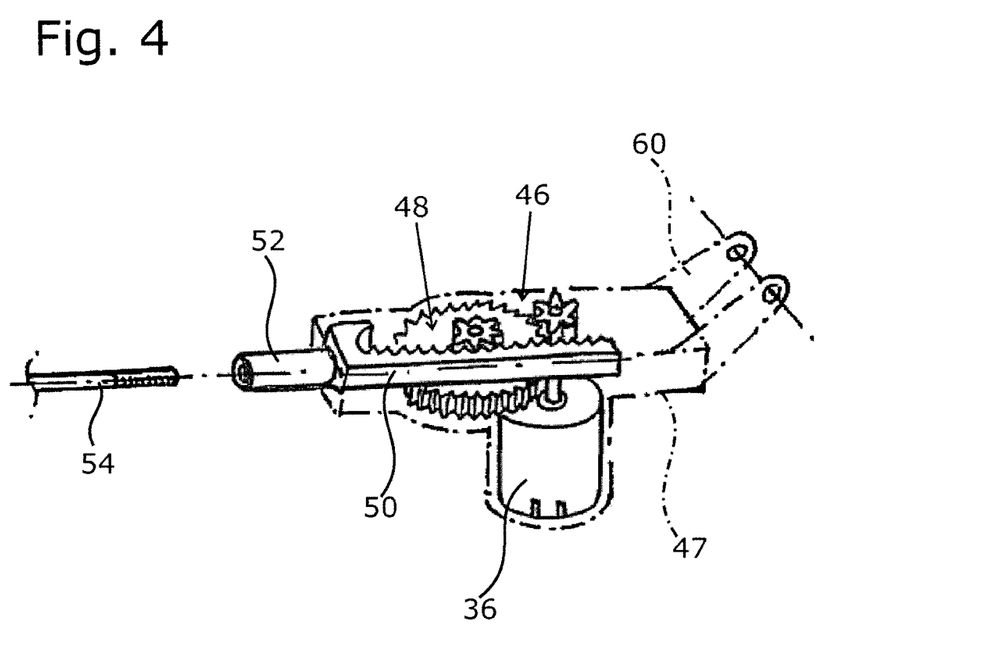
FIG. 4: shows a perspective view, partially sectional, of essential parts of the motor-operated drive.

In order to reach the release position shown in FIG. 3, the disengagement levers 56 have been moved towards each other. They are now no longer located in a single plane that is approximately (plus/minus 5 to plus/minus 10 degrees) parallel to the x-z plane, but are pivoted out of this plane at an angular position of about 15 to 30 degrees. The connecting piece 52 is now considerably shorter. It is retracted into the housing 47.

The actuating unit 30 exerts a pull. The drive motor 36 moves the two disengagement levers 56 towards each other if a release position is to be achieved. The actuating unit 30 carries out a linear movement parallel to the y-axis which extends over at least twice the distance required for releasing a locking device. In practice, when an actuating unit 30 is started, it first pulls the locking device of one seat side free, and only then the locking device of the other seat side. The actuating unit 30 only has to be mechanically designed so as to be able to pull the locking device of a seat side free. Specifically, it has to be able to pull free the locking device of that seat side that requires the greater force for a release.

It is possible that the actuating unit 30 exerts a pressure. It can also act with a curve motion.

Figure 2:
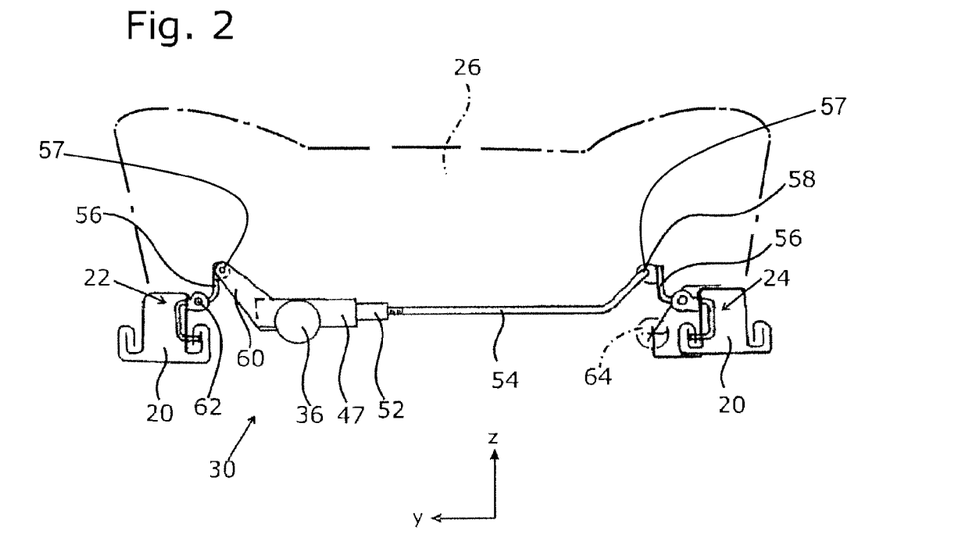
FIG. 2: shows a schematic view from the front (without backrest) of a longitudinal adjustment device with an indicated seat in the case of a viewing direction parallel to the x-axis; the locked state is shown.

As FIGS. 2 and 3 show, the disengagement lever 56 is pivotally mounted in each case about a disengagement lever axis 62; the latter is retained by components formed by the seat rail or protruding therefrom. The two disengagement lever axes 62 of a longitudinal adjustment device are parallel. In the exemplary embodiment shown, the disengagement lever 56 integrally transitions into a locking lever that causes the lock, as a comparison of FIGS. 2 and 3 shows. It comprises at least one latching pin or a latching pawl.

As a comparison of the two FIGS. 2 and 3 shows, the disengagement lever 56 is pivoted by an angle of about 10 to 30 degrees in order to arrive in the release position. An adjustment between the connecting piece 52 and the rod 54 enables an exact adaptation and setting. These two parts 52 and 54 form a setting unit. As the FIGS. 2 and 3, in particular, show, the housing 47 is mounted in a freely moveable manner; the actuating unit is attached only on the two disengagement levers 56. Thus, no additional attachment to a cross member, a seat rail or the like is necessary.

The oblique arms 60 are preferably integral parts of the housing 47. The actuator 48 can also be realized in another way, for example by an eccentric drive, a spindle drive or the like. The design and realization of the drive motor 36, the gear unit 46 and the actuator 48 with a toothed rack 50 is known in automotive engineering; it is used, for example, for door opening mechanisms in a motor vehicle. This unit can now also be utilized in seats; at least parts of it, e.g. the motor, can be used.

Figure 1:
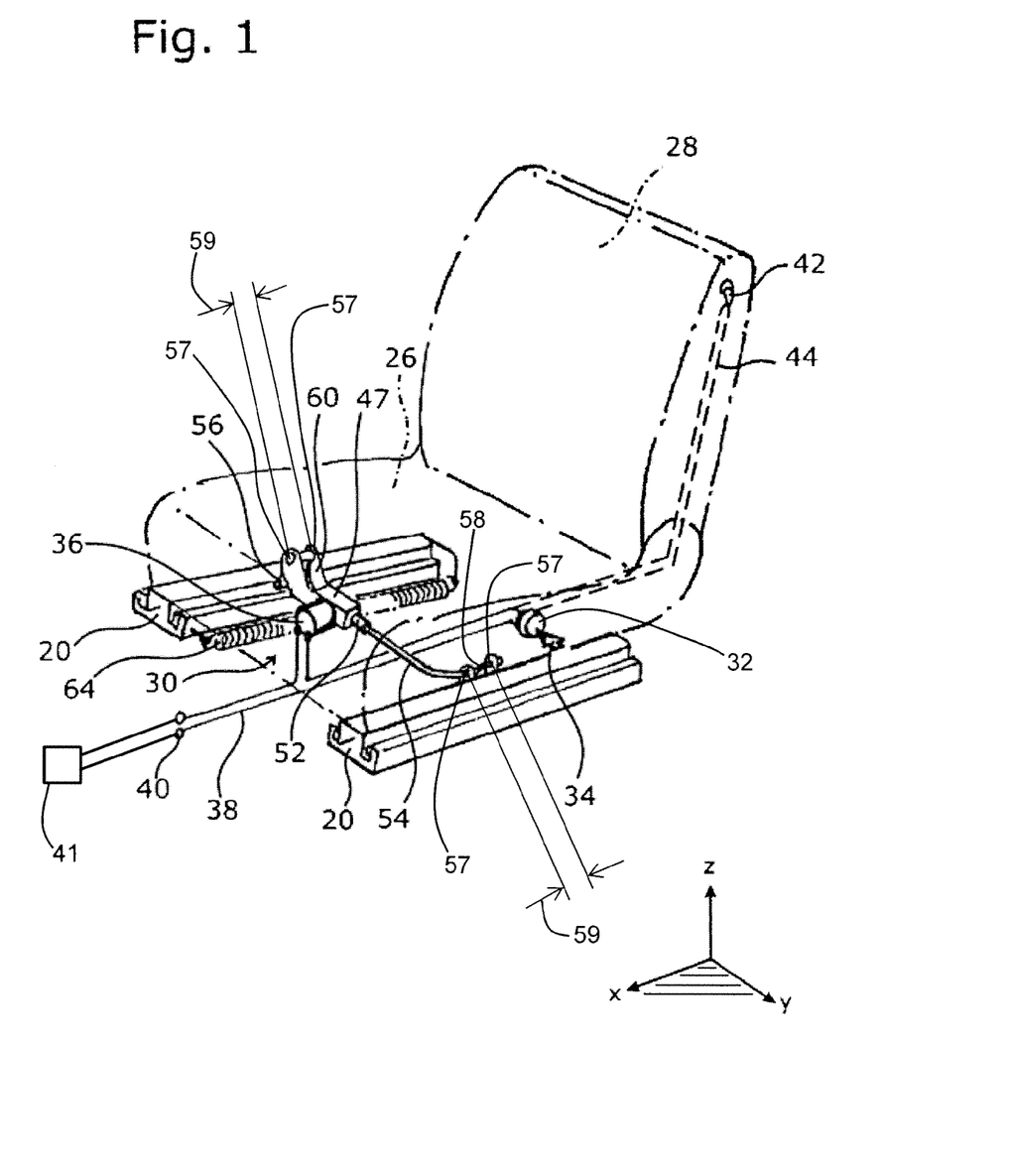
FIG. 1: shows a perspective view of a longitudinal adjustment device with an indicated motor vehicle seat.
Figure 5:
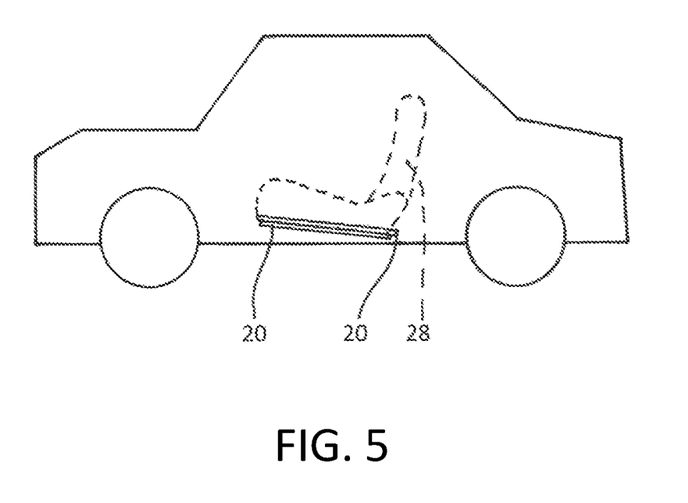
FIG. 5 shows a side view of a vehicle with the pairs of rails according to another embodiment.

A spring 64 is also apparent from the FIGS. 1 to 3, which in FIG. 1 is disposed parallel to the right-hand pair of rails 20. In FIGS. 2 and 3, however, it is disposed parallel to the left-hand pair of rails 20. It is optional. By it, the two rails of this pair of rails are subjected to a load against each other in the longitudinal direction. In the illustration according to FIG. 1, the x-y plane is the plane in which the two pairs 20 of rails are disposed. The plane of the pairs of rails and the x-y plane are parallel. However, if the pairs of rails are alternatively disposed in an oblique manner in the vehicle so that the plane of the pairs of rails 20 extends at an angle to the x-y plane (as shown, for example, in FIG. 5), a force component in the x-direction is produced in the event of a load on the vehicle seat. This force component is compensated by the spring 64, which is provided on at least one seat side.

The x-y plane is the horizontal driving plane; the z-direction is perpendicular thereto. The positive x-direction is the normal driving direction straight ahead of the vehicle.

Preferably, the vehicle seat is longitudinally displaceable by tilting its backrest 28. A button (not shown) is provided with which an electric circuit of the drive motor 36 can be closed. The button is disposed in the region of movement of the backrest 28. It is actuated and the circuit is closed if the backrest 28 has been pivoted forward by a predetermined pivot angle starting from the normal position.

The invention claimed is:

1. A longitudinal adjustment device for a motor vehicle seat, comprising:
   two pairs of rails adjustable parallel to an x-axis;
   one locking device for each of the pairs of rails, which locking devices can each be moved to a release position to allow adjustment of the respective pair of rails;
   a handling mechanism; and
   a common actuating unit for the two locking devices that cooperates with the two locking devices,
   wherein the actuating unit comprises a housing, an electric drive motor, a gear unit connected to the electric drive motor, and an actuator connected to the gear unit,
   wherein the actuating unit is configured to exert a pulling force on each of the locking devices, wherein the housing is connected to one of the locking devices and the actuator is connected to the other locking device,
   wherein the force exerted on one of the locking devices is in an opposite direction to the force exerted on the other locking device, the actuating unit carries out a linear movement to exert such forces, the linear movement is parallel to a y-axis, and the linear movement extends over at least twice a distance required to move one of the locking devices to the release position,
   wherein the x-axis and the y-axis are perpendicular to each other, and wherein one of the locking devices reaches the release position before the other of the locking devices reaches the release position.

2. The longitudinal adjustment device according to claim 1, wherein the actuating unit comprises a setting unit.

3. The longitudinal adjustment device according to claim 1, wherein the actuating unit is mechanically retained and fastened only to the two locking devices.

4. The longitudinal adjustment device according to claim 1, wherein the two pairs of rails are configured to be installed in a vehicle such that the two pairs of rails are not horizontal and are configured to move at an angle to a horizontal plane, wherein a spring acting in a longitudinal direction of the two pairs of rails is provided which substantially compensates the proportion of a load in the longitudinal direction due to a weight of a passenger.

5. The longitudinal adjustment device according to claim 1, wherein the locking devices each comprise a disengagement lever pivotable about a disengagement lever axis, and the disengagement lever axis is disposed substantially at right angles to the direction of force of the actuating unit.

6. The longitudinal adjustment device according to claim 1, wherein the locking devices each comprise a disengagement lever attached to the actuating unit, wherein each of the disengagement levers is parallel to an x-z plane when each of the respective locking devices are locked, wherein the x-z plane is perpendicular to the y-axis.

7. The longitudinal adjustment device according to claim 6, wherein each side of the actuating unit includes two mounting points, wherein each side of the actuating unit is hinged to one of the disengagement levers through the respective two mounting points, wherein each of the two mounting points are at least 10 mm from each other, whereby an anti-rotation protection is created.

8. The longitudinal adjustment device according to claim 6, wherein the disengagement levers of the locking devices are actuated counter-directionally.

9. The longitudinal adjustment device according to claim 6, wherein the disengagement levers of the locking devices are actuated symmetrically to a plane parallel to the x-z plane, wherein the z-axis is perpendicular to the y-axis and the x-axis.

10. The longitudinal adjustment device according to claim 6, wherein each of the directions of the forces that respectively act on each of the locking devices on each of the pairs of rails in order to move each of the locking devices to the release positions are directed toward the other of the pairs of rails.

11. The longitudinal adjustment device according to claim 1, wherein an electric button is configured to complete a circuit that includes the electric drive motor and a battery, and the electric button forms the handling mechanism, and the electric button is actuated while the position of the longitudinal adjustment device is adjusted.

12. The longitudinal adjustment device according to claim 1, wherein the electric drive motor is disposed closer to one pair of rails than to the other pair of rails, and the distance to the other pair of rails being greater than 2/3 of the distance of the two pairs of rails.

13. The longitudinal adjustment device according to claim 1, wherein the actuating unit first pulls the locking device of one of the pairs of rails into the release position and subsequently pulls the locking device of the other of the pairs of rails into the release position.

14. The longitudinal adjustment device according to claim 1, wherein the one of the locking devices requires a greater force to move to the release position than the other of the locking devices.

15. The longitudinal adjustment device according to claim 1, wherein the actuating unit comprises a rod that is connected to the other locking device.

16. The longitudinal adjustment device according to claim 1, wherein the locking devices each comprise a disengagement lever, wherein the housing is connected to the disengagement lever of one of the locking devices and the actuator is connected to the disengagement lever of the other locking device.

17. The longitudinal adjustment device according to claim 1, wherein each of the locking devices includes two mounting points, wherein the actuating unit is mounted to the two mounting points of one of the locking devices and is mounted to the two mounting points of the other locking device.

18. A longitudinal adjustment device for a motor vehicle seat, comprising:
two pairs of rails adjustable parallel to an x-axis;
one locking device for each of the pairs of rails, which locking devices can each be moved to a release position to allow adjustment of the respective pair of rails;
a handling mechanism; and
a common actuating unit for the two locking devices that cooperates with the two locking devices,
wherein the actuating unit comprises an electric drive motor, a gear unit connected to the electric drive motor, and an actuator,
wherein the actuating unit is configured to exert a pulling force on each of the locking devices,
wherein the actuating unit is located between the two locking devices and has a first end and a second end, wherein the first end of the actuating unit is connected to one of the locking devices and the second end of the actuating unit is connected to the other locking device,
wherein the force exerted on one of the locking devices is in an opposite direction to the force exerted on the other locking device, the actuating unit carries out a linear movement to exert such forces, the linear movement is parallel to a y-axis, and the linear movement extends over at least twice a distance required to move one of the locking devices to the release position,
wherein the x-axis and the y-axis are perpendicular to each other, and wherein one of the locking devices reaches the release position before the other of the locking devices reaches the release position.

19. A longitudinal adjustment device for a motor vehicle seat, comprising:
two pairs of rails adjustable parallel to an x-axis;
one locking device for each of the pairs of rails, which locking devices can each be moved to a release position to allow adjustment of the respective pair of rails, wherein each of the locking devices comprises a disengagement lever;
a handling mechanism; and
a common actuating unit for the two locking devices that cooperates with the two locking devices,
wherein the actuating unit comprises an electric drive motor, a gear unit connected to the electric drive motor, and an actuator,
wherein the actuating unit is configured to exert a pulling force on each of the disengagement levers,
wherein the actuating unit is located between the two disengagement levers and has a first end and a second end, wherein the first end of the actuating unit is connected to one of the disengagement levers and the second end of the actuating unit is connected to the other disengagement lever,
wherein the force exerted on one of the disengagement levers is in an opposite direction to the force exerted on the other disengagement levers, the actuating unit carries out a linear movement to exert such forces, the linear movement is parallel to a y-axis, and the linear movement extends over at least twice a distance required to move one of the locking devices to the release position,
wherein the x-axis and the y-axis are perpendicular to each other, and wherein one of the locking devices reaches the release position before the other of the locking devices reaches the release position.

* * * * *